(No Model.)

S. S. WOODBURY.
APPARATUS FOR THE PASTEURIZATION OF BEER.

No. 482,667. Patented Sept. 13, 1892.

WITNESSES
Geo. E. Fruh.
Roland A. Fitzgerald

INVENTOR
S. S. Woodbury
per Lehmann & Pattison
attys.

United States Patent Office.

SAMUEL S. WOODBURY, OF BRADFORD, PENNSYLVANIA.

APPARATUS FOR THE PASTEURIZATION OF BEER.

SPECIFICATION forming part of Letters Patent No. 482,667, dated September 13, 1892.

Application filed November 2, 1891. Serial No. 410,651. (No model.)

*To all whom it may concern:*

Be it known that I, SAMUEL S. WOODBURY, of Bradford, in the county of McKean and State of Pennsylvania, have invented certain new and useful Improvements in Apparatus for the Pasteurization of Beer; and I do hereby declare the following to be a full, clear, and exact description of the invention, such as will enable others skilled in the art to which it pertains to make and use it, reference being had to the accompanying drawings, which form part of this specification.

My invention relates to an improvement in apparatus for the pasteurization of beer; and it consists in the combination and arrangement of parts, which will be fully described hereinafter, and particularly referred to in the claim hereto annexed.

The object of my invention is to construct an improved means for introducing steam and water into tanks containing bottled beer for the pasteurization of the same.

My improvement consists in discharging the steam and water into the tank at the bottom of the same by means of pipes which lead directly to the upper end of the discharge-pipe and which are not in any way connected to or brought in contact with the inner walls of the tank or vat.

The process consists in placing the bottled beer in a vat and filling the same with water. Steam is then introduced into the vat for the purpose of heating the water to a degree sufficient to destroy the germs or yeast molecules and preventing further fermentation. A common way of accomplishing the heating of the water is by discharging steam therein near its top surface and allowing the steam to circulate downward and gradually heat the whole body of water contained in the tank. A great disadvantage in this process is that the steam, being discharged near the surface of the water, will be less likely to circulate than though it were to enter the water near the bottom, in which case its ascension would be a natural result and the water would be more quickly and evenly brought to a uniform temperature. With this object in view of making a more even distribution of the water and steam than has heretofore been accomplished an apparatus is illustrated in the accompanying drawings for accomplishing the desired result, in which—

Figure 1:
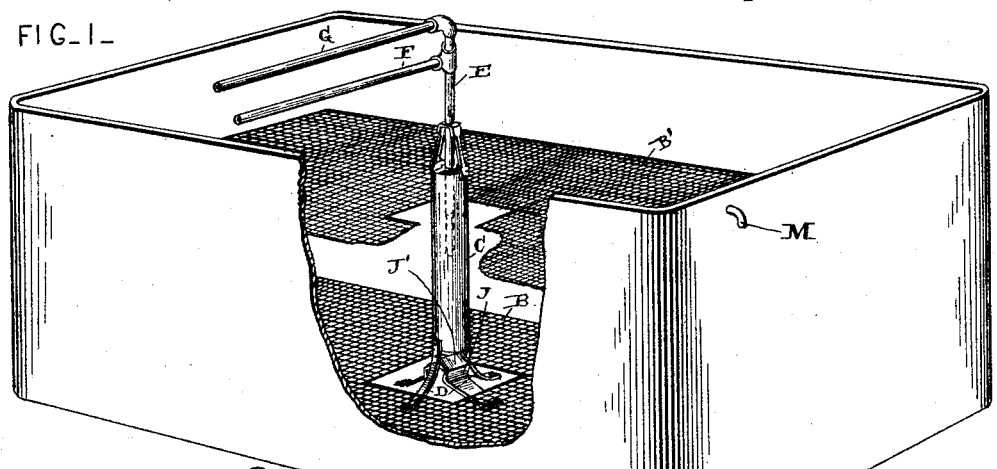
Figure 2:
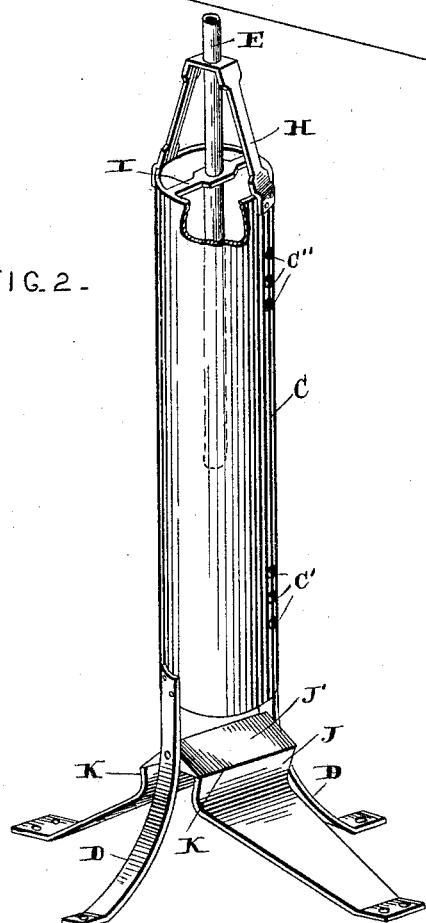
Figure 3:
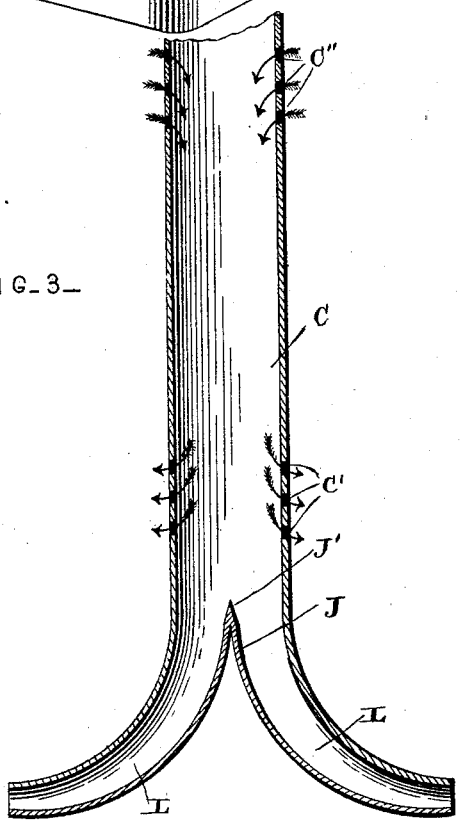

Figure 1 is a perspective view of my improved apparatus, one side of the vat being broken away. Fig. 2 is a detached view of the discharge-pipe and deflector. Fig. 3 is a slight modification of the construction illustrated in Fig. 2.

A represents a tank or vat, which is provided with a grating B in its bottom, upon which are placed the bottles of beer.

Supported above the bottom of the vat upon suitable legs D is a circulation-pipe C, the lower end of which is open and unobstructed. A second grating B' is supported, as shown, in the tank so that the tops of the bottles resting thereon will be on a level with the upper end of the pipe C.

Extending into the upper end of the pipe C is a pipe E, to which are connected the water-supply pipe F and steam-supply pipe G. The pipe E is supported in position in the upper end of the pipe C by the outwardly-extending side braces H and the cross-support I. The support and braces are formed, as shown, with a reduced portion between their ends, so as to leave the upper end of the pipe C as free and unobstructed as possible. By this construction the said pipe is held firmly in position.

Immediately beneath the lower end of the pipe C is arranged the deflector J, the cone J' of which is in a line with the center of the pipe C. The ends of this deflector are secured to the bottom of the vat, as shown, and it is further braced in its position by being secured at its opposite sides to the supports D. The sides of the deflector may be made straight, as shown, or they may be constructed with a ridge K, as shown in Fig. 2, in which case the water and steam being discharged over it is given a greater deflection.

A modification is shown in Fig. 3 in which the lower end of the pipe C is split and the sides bent outward in opposite directions, making room for a deflecting portion L, as shown. By means of the deflectors the steam and water, respectively, are distributed in the bottom of the tank, from which they will rise and circulate in every portion of the vat, equalizing the temperature evenly and quickly.

The upper and lower portions of the pipe C are preferably provided with the perforations C' C'', respectively, which enable a lateral current or currents to be passing through the pipe, the downward suction caused by the water or steam discharging from the pipe E causing an inflow of the water contained in the vat and the perforations C' serving as an outlet therefor. By this peculiar construction I am enabled to secure a more ready and even equalization of the fluids of different temperature. This feature, however, is not essential to the successful operation of the steamer and may be dispensed with, if so desired.

The principal advantage claimed in the construction is the immediate equalization of the heat, or if any difference occurs the water will be a trifle warmer at the lower ends of the bottles, where the largest bulk of beer is contained, thus heating the contents of the bottles more evenly than could be done in any other way. If the steam is introduced into the water near its surface, a portion of the steam may escape and be wasted, and another disadvantage in this way of introducing the steam is that the beer is heated at the upper ends of the bottles, where the smallest quantity of liquid is contained, and this portion being heated its natural tendency will be to remain at the top, and thus leave the lower portion cooler and create different degrees of temperature in the same bulk of beer, which detracts greatly from the quality of the same. After the beer has been sufficiently heated and it is desired to cool the same water is introduced through the pipe F into the bottom of the tank in a manner similar to the introduction of the steam. An overflow-pipe M is provided in the wall of the vat A near its top, through which the hottest water in the vat escapes as fast as cold water enters through the pipe F. By this method I again, as in the manner of steaming, get the best possible results, first, in the quality of work performed, and, second, in the time and water saved. Owing to the natural tendency of the cold water to remain at the bottom of the tank the current does not carry it above the tops of the bottles supported on the upper grating, thus cooling the beer contained in the bottoms of the bottles, where the largest bulk is situated, enough faster than at the tops of the bottles to cool the entire contents evenly, while if cooled from the top, or, in other words, if the water were introduced at the top, the coldest beer would settle to the bottom of the bottles, thus disturbing and injuring the beer, and as the hottest water is continually rising to the top of the tank, where it escapes undisturbed by the current, only about one-half of the water and time are required for cooling.

Having thus described my invention, I claim—

The combination, with a tank, of a circulation-pipe supported therein, a hot and cold supply-pipe connected to the upper end of the circulation-pipe, and a deflector composed of diverging sides arranged beneath the last-named pipe, substantially as shown and described.

In testimony whereof I affix my signature in presence of two witnesses.

SAMUEL S. WOODBURY.

Witnesses:
I. G. HOWE,
C. P. CODY.